Patented May 8, 1923.

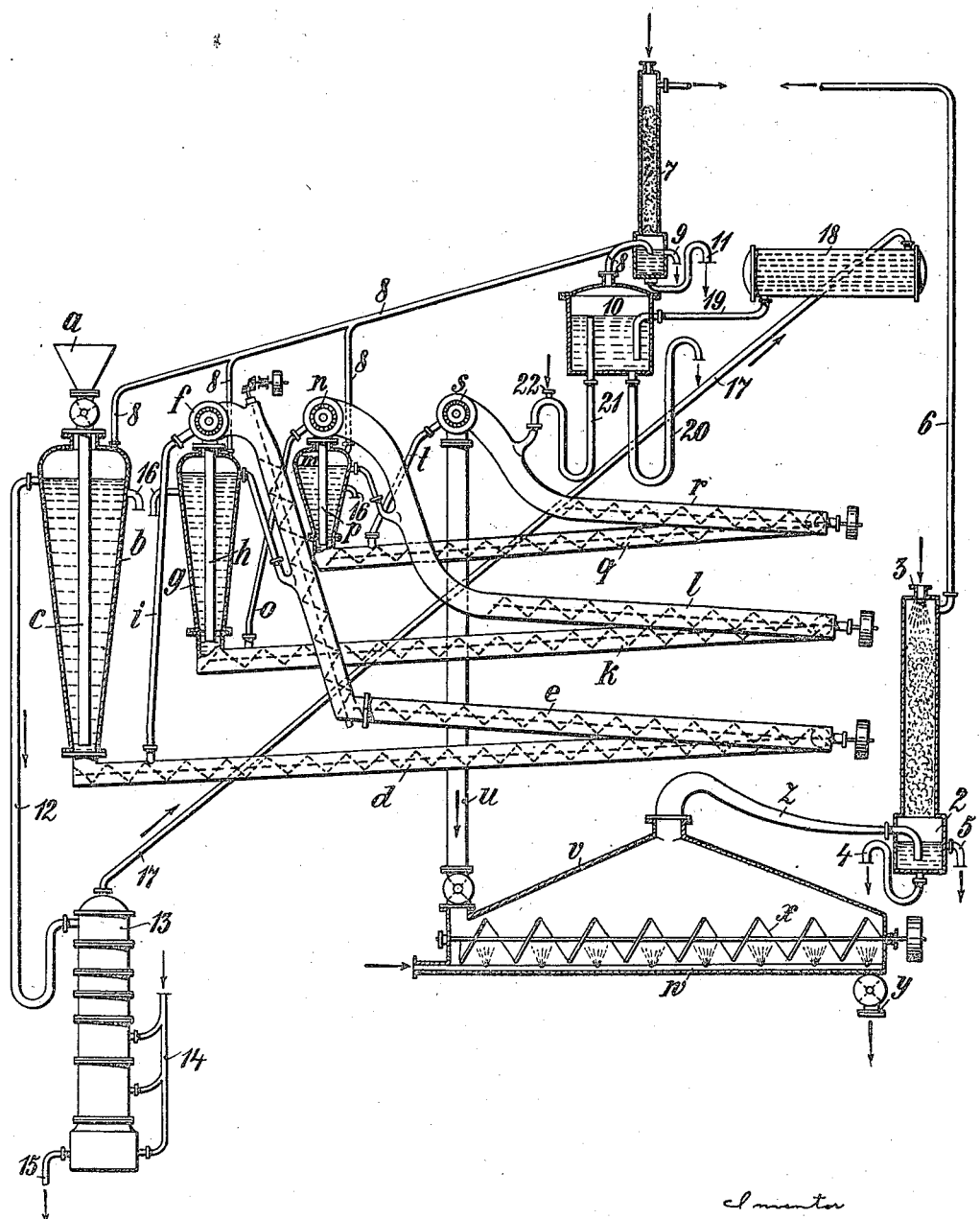

1,454,419

UNITED STATES PATENT OFFICE.

MOSE WILBUSCHEWITSCH, OF ZURICH, SWITZERLAND.

APPARATUS FOR CONTINUOUS EXTRACTION, PARTICULARLY OF OIL.

Application filed August 11, 1920. Serial No. 402,863.

*To all whom it may concern:*

Be it known that I, MOSE WILBUSCHE-WITSCH, a citizen of the Swiss Confederation, residing at Zurich, Switzerland, have invented certain new and useful Improvements in Apparatus for Continuous Extraction, Particularly of Oil (for which I have filed application in Germany June 12, 1919; France, June 18, 1920), of which the following is a specification.

This invention relates to an apparatus for the continuous extraction of oil and other substances and it comprises means for bringing the substance to be extracted in contact with the solvent whereupon it is submitted to mechanical squeezing. The treatment of the extraction substance can be improved by treating the substance again with the solvent after it has been squeezed and to squeeze it again. This alternating dissolving and mechanical squeezing can be repeated as often as is necessary.

The accompanying drawing illustrates diagrammatically an apparatus for extracting oil in the manner above described.

The material to be extracted, e. g. oil containing fruit and the like, which has been prepared in the proper manner, is fed through a funnel $a$ into a tube $c$ which brings in into the lower end of a receptacle $b$. This receptacle is filled with a solvent, e. g. benzine. A conveyor worm $d$ at the lower end of the receptacle $b$ carries the material to a conveyor worm $e$ which conducts the material to a squeezer $f$. This squeezer can be of any convenient construction and is arranged above a receptacle $g$ filled with benzine. The squeezed oil cake sinks in the tube $h$ to the bottom of receptacle $g$, the oil is dissolved in the benzine flowing from the squeezer $f$ through a pipe $i$ to the conveyor worm $d$ to be treated again in the manner hereinbefore described.

The material to be extracted is transported by means of two conveyor worms $k$ and $l$ from the lower part of the receptacle $g$ to a squeezer $n$ arranged above a third receptacle $m$, the oil dissolved in the benzine being conducted through a pipe $o$ from the squeezer $n$ back to the conveyor worm $k$, the squeezed material being brought through a tube $p$ into the receptacle $m$ filled with benzine. From here the material is conducted by two conveyor worms $q$ and $r$ to a third squeezer $s$ from which the oil dissolved in benzine is conducted through pipe $t$ to the conveyor worm $q$ the material which is now free of oil being conducted through a pipe $u$ to a trough $v$ in which it is blown out by steam with the aid of a steam pipe $w$. The material is then conveyed by the conveyor worm $x$ in trough $v$ to the outflow $y$ provided with a device for drawing off. The steam and the benzine vapors drawn along by the steam flow through a conduit $z$ to a separator 2 in which water and benzine settle under the influence of water injected from above at 3. The water flows out through pipe 4, the benzine being drawn off through the pipe 5. The separator 2 is connected with a vacuum pump by means of a conduit 5. A second separator 7 of similar construction is also connected with the vacuum pump. Conduits 8 lead to this separator from the receptacles $b$, $g$ and $m$ and 10 so that the benzine vapour and the air which collect in the same can escape. The benzine flows out of the separator 7 through the conduit 9, the water which has been injected and which has separated from the benzine flowing out through pipe 11.

Part of the oil can be drawn off from the receptacles $b$, $g$ and $m$ according to the quality by means of a pipe 12 which, as shown in the drawing, connected the first receptacle $b$ with a distilling vessel 13 in which the benzine is evaporated by means of steam injected through a pipe 14, the vapours thus generated being drawn along by the steam so that at the lower end of the distilling vessel the pure oil can flow out through pipe 15. In order to observe the quality of the solution in the several receptacles $b$, $g$ and $m$ these receptacles can be fitted with the test cocks 16.

The mixture of steam and benzine vapours is conducted from the distilling vessel 13 through a pipe 17 into the condenser 18 where it settles. The condensate flows through pipe 19 into the collector 10 in which the water separates from the benzine. The water which is heavier than the benzine flows off through pipe 20, the benzine being conducted to the plant through pipe 21 to the conveyor worm $r$. The benzine circulates through the plant in opposite direction as the material to be extracted; said material does not completely fill the pipes of the conveyor worms leaving thus sufficient room for the benzine which continuously filters through the material and gets gradually more saturated. The conveyor worms have preferably conveying arms instead of discs. The loss of benzine is replaced through filling in fresh benzine through a funnel 22 mounted upon tube 21.

I claim:—

An apparatus for the extraction of oil from fruits by means of a solvent, comprising a series of long tubes, means for forcing the extraction material through said tube in counter current to the solvent, machines for repeated mechanical expression interposed between said tubes, a still for separating the oil from the solvent, and means for introducing the solvent into the series of tubes and thereby producing a closed circulation of the solvent.

In testimony whereof I affix my signature in presence of two witnesses.

MOSE WILBUSCHEWITSCH.

Witnesses:
 ROEUL MASCOW,
 MAX MILLER.